United States Patent [19]

Livesay

[11] 4,278,303

[45] Jul. 14, 1981

[54] FORCE AND NOISE ISOLATING APPARATUS FOR CONTINUOUS TRACK SYSTEM

[75] Inventor: Richard E. Livesay, Peoria, Ill.

[73] Assignee: Caterpillar Tractor Co., Peoria, Ill.

[21] Appl. No.: 88,193

[22] Filed: Oct. 23, 1979

Related U.S. Application Data

[63] Continuation-in-part of Ser. No. 909,757, May 26, 1978, abandoned.

[51] Int. Cl.³ .............................................. B62D 55/12
[52] U.S. Cl. .................................... 305/57; 180/9.62; 474/161; 474/901; 474/902
[58] Field of Search ................. 305/57, 21, 24, 27–29, 305/31, 60; 180/9.62, 9.64; 152/7, 42–43; 474/901, 902, 161–163

[56] References Cited

U.S. PATENT DOCUMENTS

| Re. 23,161 | 10/1949 | MacLean . | |
|---|---|---|---|
| 1,241,617 | 10/1917 | Fuller et al. | 305/57 |
| 2,599,233 | 6/1952 | Christie . | |
| 2,854,294 | 9/1958 | Bannister . | |
| 2,919,951 | 1/1960 | Boschi . | |
| 3,333,903 | 8/1967 | Orr et al. | 305/53 |
| 3,504,562 | 4/1970 | Hirtch | 305/57 |
| 3,578,822 | 5/1971 | Slemmons | 305/57 X |
| 3,730,013 | 5/1973 | Slemmons | 305/57 X |
| 4,068,698 | 1/1978 | Boggs | 305/57 X |

FOREIGN PATENT DOCUMENTS

| 728709 | 12/1942 | Fed. Rep. of Germany | 305/57 |
|---|---|---|---|
| 1150583 | 6/1963 | Fed. Rep. of Germany | 474/161 |

*Primary Examiner*—Charles A. Marmor
*Attorney, Agent, or Firm*—William B. Heming

[57] ABSTRACT

A wheel (16) in a continuous track assembly (12) has a hub (18) and a rim (20) connected to the hub (18). First apparatus (29) engages a track (14) of the assembly (12) to drive an associated work vehicle (10). Second apparatus (42) mounts the rim (20) in a movable relationship to the hub (18). The first apparatus (29) in movable relationship to the rim (20) to substantially absorb and isolate noise created by engagement of the wheel (16) and track (14) to drive the vehicle (10). The rim (20) is movable relative to the hub (18) to substantially isolate impact forces exerted on the wheel (16) resulting from operation of the vehicle (10).

9 Claims, 3 Drawing Figures

FORCE AND NOISE ISOLATING APPARATUS FOR CONTINUOUS TRACK SYSTEM

CROSS REFERENCE TO RELATED APPLICATION'S

This is a continuation-in-part Application of application Ser. No. 909,757 filed May 26, 1978, by Richard Livesay, now abandoned.

DESCRIPTION

TECHNICAL FIELD

The invention relates generally to impact force and sound isolation and absorption in continuous track assemblies and more particularly to portions of a wheel of the track assembly being movable in response to forces on the wheel in order to isolate and absorb the impact forces and sound.

BACKGROUND OF THE INVENTION

In the use of a continuous track assembly, it is desirable to reduce the sound generated by the drive wheel engaging the track and to reduce impact forces on said wheel from operation of the vehicle.

For example, a continuous track assembly of a work vehicle includes a continuous track engaged and driven by a wheel. Relative movement of contacting portions of the wheel and track during engagement generates noise. Also, engagement and subsequent vhicle movement tends to exert impact forces on the wheel.

Commonly heretofore, the shock from the impact forces has been absorbed by the substantially rigid wheel and the noises of track engagement have not generally been isolated from the environment. The result can be increased wear of vehicle components and an undesirable noise level. In some applications, rubber pads on a wheel have been used to cushion contact with a track such as is shown in U.S. Pat. No. 3,730,013 which issued to A. J. Slemmons, on May 1, 1973.

The present invention is directed to overcoming one or more of the problems as set forth above.

DISCLOSURE OF THE INVENTION

In one aspect of the present invention, a wheel in a continuous track assembly has a hub and a rim connected to the hub. First means is provided for engaging and driving a track of the assembly. Said first means is movable relative to the rim in response to forces exerted on said means by the track. Second means mounts the rim on and in movable relationship relative to the hub with the rim being movable in response to forces exerted on the wheel.

Engagement of a wheel and track in the continuous track assembly of a work vehicle tends to generate unwanted noise, as well as result in impact forces on the wheel from the resultant operation of the vehicle. In the track assembly, the noise is substantially isolated owing to the movement of the first means, which engages the track in order to drive said track, relative to the rim. The impact forces are substantially isolated owing to movement of the rim relative to the wheel to absorb such forces.

BEST MODE FOR CARRYING OUT THE INVENTION

Figure 1:
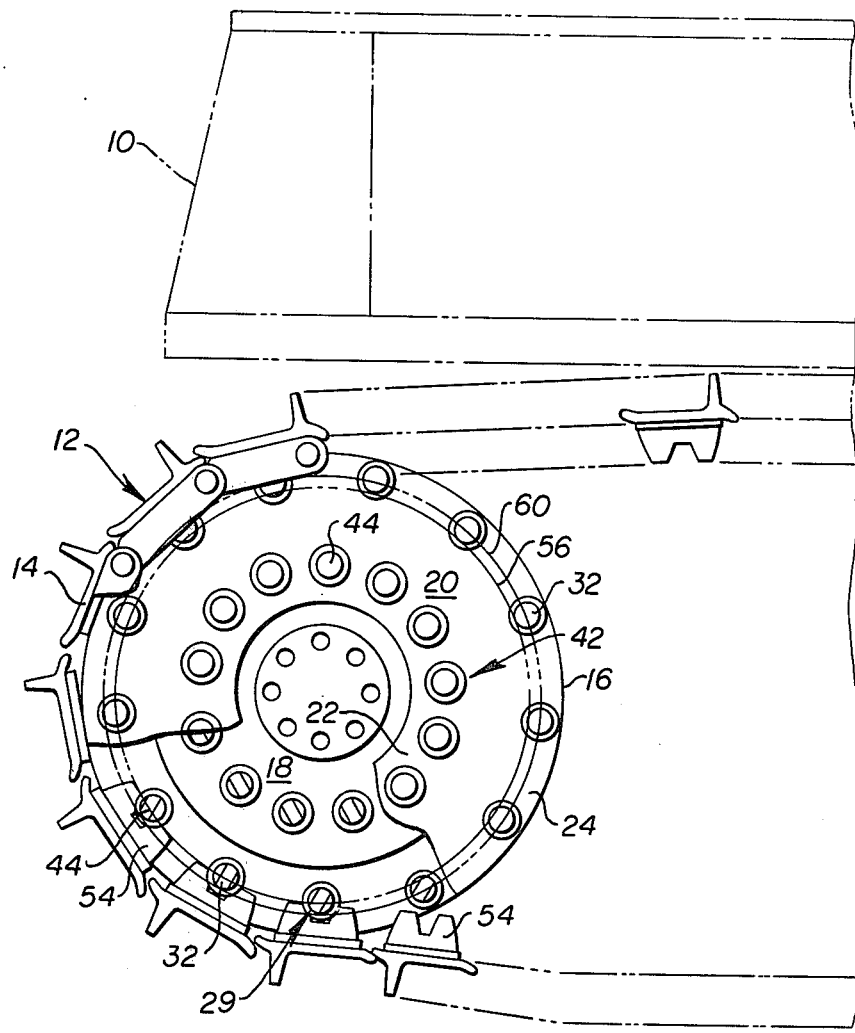
FIG. 1 is a side elevational partial cutaway view showing one embodiment of the present invention used on the continuous track assembly of a work vehicle.

Referring to the drawings, and particularly to FIG. 1, a work vehicle 10 has a continuous track assembly 12 which includes a continuous track 14 and a wheel 16. The wheel has a hub 18 and a rim 20 connected to the hub 18. In the embodiment shown, the rim has first and second end portions 22,24 and first and second spaced apart elements 26,28 which are interconnected at the first end portion of the rim to the hub 18 in a manner to be explained later. The wheel is rotatably driven through the drive train (not shown) of the work vehicle to engage and drive the track in order to propel the work vehicle, as is generally known in the track-type tractor art.

Figure 2:
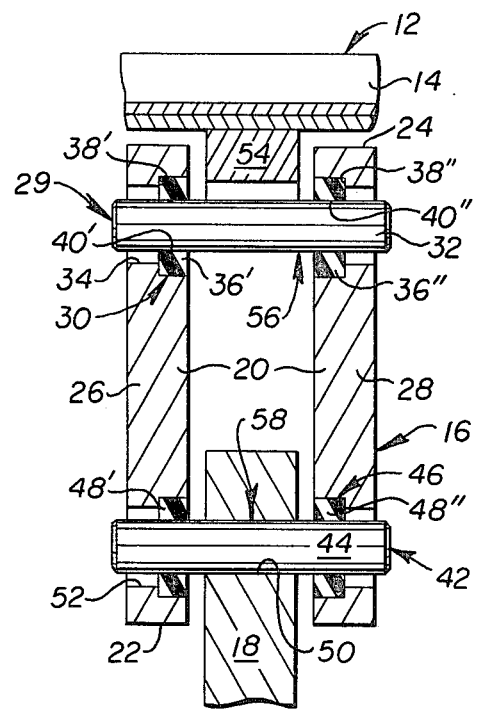
FIG. 2 is a somewhat enlarged cross-sectional view showing the embodiment of FIG. 1 in greater detail and free from forces exerted thereon by a track of the continuous track system.

The continuous track assembly 12 includes first or track engaging means 29 for engaging and driving the track 14 and which is mounted on the rim and movable relative to the rim 20 in response to forces exerted on the first means by the track. In other words, that portion of the wheel 16, represented by said first means, which is operative to engage and drive the continuous track, is also movable relative to the rim of the wheel. The first means has a plurality of biasing means 30 and drive pins 32, but for convenience detailed discussion will be limited to a single pin and biasing means as shown in FIG. 2. The other pins and biasing means are of similar construction and are positioned about the perimeter of the wheel as shown in FIG. 1.

The drive pin is positioned in and extends through an opening 34 in the second end portion 24 of the rim 20 which is positioned in and passes through both the spaced apart elements 26,28. The biasing means 30, shown as elastomeric springs 36',36" of material such as rubber, is positioned between the drive pin and the rim for moving said drive pin relative to the rim in response to forces exerted on the pin (see FIGS. 2 and 3). The elastomeric springs are each positioned in a respective portion of the opening through the second end portion of the rim. Each of the springs is retained by a lip 38',38" in the rim opening and has an opening 40',40" through which the drive pin passes to be engaged by the springs in the desired position relative to the rim.

Second or connecting means 42 of the track assembly 12 is provided for mounting the rim 20 on and in movable relationship relative to the hub 18. It will also be understood from a study of the drawings that the first or track engaging means 29 moves relative to the hub 18 through the connecting means 42. The second means includes a plurality of connecting pins 44 and biasing means 46 as is shown in FIG. 1 and of which only the details of a single pin and biasing means will be discussed for convenience. The biasing means is shown as elastomeric springs 48',48" of a material such as rubber. The pin is positioned through an opening 50 in the hub and an opening 52 in the first end portion 22 of the rim which passes through both the first and second spaced apart elements 26,28 of the rim. The springs, each positioned in a respective portion of the opening in the rim and between the pin and the rim, move the rim relative to the pin in response to forces exerted on the rim in the embodiment shown. The pin is preferably positioned in said hub opening in contact with the hub in a press fit to position it relative to the hub. As with the drive pin 32, the connecting pin passes through openings in the elastomeric springs to position the hub relative to the rim through the pin. It should be understood that the biasing means can also be positioned between the hub and the pin or between both the rim and hub and the pin.

For optimum operation of the wheel 16 in isolating forces and noise as will be explained, it is desirable that the biasing means 30,42 associated with the drive and connecting pins 32,44 have reselected biasing constants. The preselected biasing constant of the biasing means associated with the connecting pin is preferably in a range of about 0.25T to about 0.35T Newtons per millimeter, where T, in Newtons, is equal to the total mass in kilograms of the work vehicle 10 multiplied by an acceleration of 1000 millimeters per second per second. The preselected biasing constant of the biasing means associated with the drive pin is preferably in a range of about 0.02T to about 0.04T Newtons per millimeter, where T, in Newtons, is equal to the total mass in kilograms of the work vehicle 10 multiplied by the acceleration of 1000 millimeters per second per second. Also, it is desirable that the ratio of the biasing constant related to the connecting pin to the biasing constant related to the drive pin be in a range of about 15 to 1 to about 20 to 1.

It should be understood that the wheel 16, including the first and second means 29,42, can be of other configurations as is known in the art without departing from the invention.

INDUSTRIAL APPLICABILITY

Figure 3:
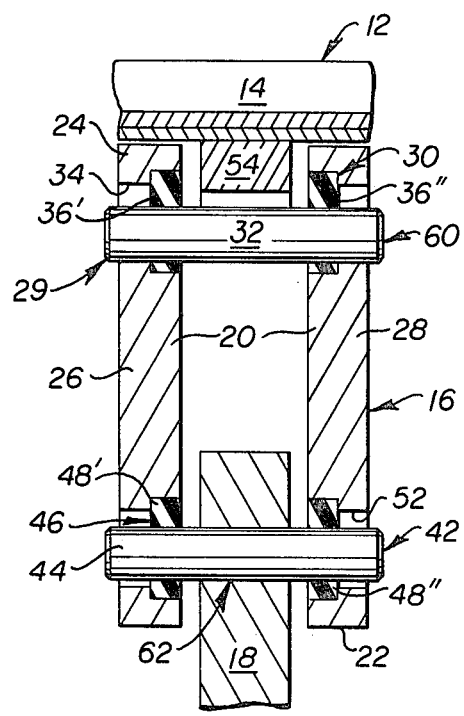
FIG. 3 is a cross-sectional view similar to FIG. 2 but showing the present invention in operation through external forces being exerted thereon.

In the operation of the continuous track assembly 12, the drive pins 32 of the rotating wheel 16 engage teeth 54 of the track 14 to drive the work vehicle 10. During engagement, the track is properly guided owing to the teeth passing between the spaced apart elements 26, 28 of the rim 20. The track exerts forces on the wheel through the drive pins which tend to move the drive pins against their related elastomeric springs 36 to substantially absorb and isolate sound associated with the contacting relationship of and relative movement between the track teeth and the pins (FIG. 3). Also, the rim 20 is urged against the elastomeric springs 48 by impact forces on the wheel, thereby being displaced relative to the hub 18 (FIG. 3). In this manner, impact forces exerted on the wheel, primarily through contact with the track, are substantially absorbed and isolated from the work vehicle. Some impact forces will be absorbed by the springs associated with the drive pins and some noise will be absorbed by the movement of the rim against its associated springs. However, it is anticipated that the primary action of the respective springs as above described will be the most desirable operation of the system.

In FIG. 2 the drive pin 32 and the rim 20 are shown at their respective first or centered positions 56,58. At said positions, the pin and rim are subject to essentially no substantial external forces and thus are not urged against their related elastomeric springs 36,48. When one of the track teeth 54 is engaged by a drive pin under conditions sufficient to radially move the drive pin, the elastomeric springs 36 move the pin toward a second or displaced position 60 at a preselected rate relative to the rim, as determined by the spring constant of the springs. In FIG. 3, the drive pin is shown in such a displaced second position at which said drive pin is blocked from further radial movement by having "bottomed out" against a wall of the opening 34 in the rim. The pin thus acts without relative movement with respect to the rim and forces exerted by the track pass directly onto the rim.

The rim 20 is also shown in FIG. 3 at a second or displaced position 62 resulting from the impact forces on the wheel being sufficient to move the rim 20 relative to the hub 18 against the springs 48. Eventually, the rim can also "bottom out" against the connecting pin 44 if the impact forces are of a sufficient magnitude. Similar to the springs 36 associated with the drive pin 32, the elastomeric springs 48 positioned between the rim 20 and the connecting pin 44 move the rim at a preselected displacement rate to absorb the impact forces as determined by the spring constant of the springs. Where desired in some embodiments, the spring constants of the elastomeric springs 36,48 associated with both the drive pins 32 and the rim 20 can be provided such that the drive pin will be moved into contact with the rim before the forces on the wheel become sufficient to move the rim relative to hub. In other words, the rim will be movable from its first 58 toward a displaced position only after the loaded drive pins have reached their maximum relative displacement.

Other aspects, objects and advantages will become apparent from a study of the specification, drawings and appended claims.

I claim:

1. In a continuous track assembly (12) having a track (14) and a wheel (16) having a hub (18) and a rim (20) connected to the hub (18), the improvement comprising:

said rim (20) having first and second end portions (22,24) and first and second spaced apart elements (26,28), said second end portion (24) having an opening (34) positioned in said spaced apart elements (26,28);

a drive pin (32) positioned in said opening (34) of said second end portion (24) for engaging and driving said track (14);

biasing means (30) for moving said drive pin (32) relative to said rim (20) in response to forces exerted on said drive pin (32) by said track (14); and connecting means (42) for mounting said rim (20) on and in movable relationship relative to said hub (18), said rim (20) being movable relative to said hub (18) in response to forces exerted on said wheel (16).

2. The continuous track assembly (12), as set forth in claim 1, including a work vehicle (10) and wherein the continuous track assembly (12) is connected to said vehicle (10) and said connecting means (42) includes biasing means (46) having a preselected biasing constant in a range of about 0.25T to about 0.35T Newtons per millimeter, where T, in Newtons, is equal to the total mass in kilograms of the work vehicle (10) multiplied by an acceleration of 1000 millimeters per second per second.

3. The continous track assembly (12), as set forth in claim 2, wherein said biasing means (46) associated with said connecting means (42) is an elastomeric spring (48).

4. The continuous track assembly (12), as set forth in claim 2, wherein said biasing means (30) associated with said drive pin (32) has a preselected biasing constant in a range of about 0.02T to about 0.04T Newtons per millimeter, where T, in Newtons, is equal to the total mass in kilograms of the work vehicle (10) multiplied by the acceleration of 1000 millimeters per second per second.

5. The continuous track assembly (12), as set forth in claim 4, wherein the ratio of the preselected biasing constant associated with said preselected biasing constant associated with said connecting means (42) to the preselected biasing constant associated with said drive pin (32) is in a range of about 15 to 1 to about 20 to 1.

6. The continuous track assembly (12), as set forth in claim 1, wherein said drive pin (32) is movable relative to said rim (20) from a first position (56) toward a second position (60) at which said drive pin (32) is blocked from further movement relative to said rim (20) and said rim (20) is movable relative to said hub (18) at said second position (60) of said drive pin (32).

7. The continuous track assembly (12), as set forth in claim 1, wherein said first end portion (22) of said rim (20) has an opening (52), said hub (18) has an opening (50), and said connecting means (42) includes:
    a connecting pin (44) positioned through said openings (50,52) of said hub (18) and said first end portion (22) of said rim (20); and
    biasing means (46) for moving at least one of said rim (20) and hub (18) relative to said connecting pin (44) in response to forces exerted on said rim (20).

8. The continuous track assembly (12), as set forth in claim 7, wherein said connecting pin (44) is positioned in said opening (50) of said hub (18) in contact with said hub (18) and said biasing means (30) associated with said connecting means (42) is positioned between said connecting pin (44) and said rim (20) in said opening (52) of said first end portion (22) of said rim (20).

9. A wheel (16) for a continuous track assembly (12), comprising:
    a hub (18);
    a rim (20);
    connecting means (42) for mounting said rim (20) on and in movable relationship to said hub (18), said connecting means (42) including a connecting pin (44) passing through said rim (20) and said hub (18) and biasing means (46) for resiliently supporting said connecting pin (44) relative to one of said rim (20) and said hub (18); and
    track engaging means (29) mounted on said rim (20) for moving relative to said rim (20) and for moving relative to said hub (18) through said connecting means (29), said track engaging means (29) including a drive pin (32) passing through said rim (20) and biasing means (30) for resiliently supporting said drive pin (32) relative to said rim (20).

* * * * *